Sept. 2, 1969  E. J. KOCH  3,464,087
MULTIPLE-CHANNEL EXTRUSION DIE FOR THE PRODUCTION OF
MULTILAYER THERMOPLASTIC SHEET MATERIALS
Filed Aug. 8, 1967  2 Sheets-Sheet 1

INVENTOR
EDWARD J. KOCH

Sept. 2, 1969                    E. J. KOCH                    3,464,087
          MULTIPLE-CHANNEL EXTRUSION DIE FOR THE PRODUCTION OF
                 MULTILAYER THERMOPLASTIC SHEET MATERIALS
Filed Aug. 8, 1967                                      2 Sheets-Sheet 2

INVENTOR
EDWARD J. KOCH by: Gary, Parker, Juettner + Cullinan
                              ATTYS.

United States Patent Office 3,464,087
Patented Sept. 2, 1969

3,464,087
MULTIPLE-CHANNEL EXTRUSION DIE FOR THE PRODUCTION OF MULTILAYER THERMOPLASTIC SHEET MATERIALS
Edward J. Koch, Dallas, Tex., assignor to St. Regis Paper Company, New York, N.Y., a corporation of New York
Continuation-in-part of application Ser. No. 437,840, Mar. 8, 1965. This application Aug. 8, 1967, Ser. No. 662,267
Int. Cl. B29f 3/04
U.S. Cl. 18—12                                    3 Claims

ABSTRACT OF THE DISCLOSURE

A multiple-channel die is disclosed in which the thickness of the sheet that is extruded from each channel is controlled by a wedge that can be moved toward or away from the entrance to the channel.

---

This application is a continuation-in-part of my prior application Ser. No. 437,840, filed Mar. 8, 1965, now abandoned.

This invention relates to an apparatus including a muliple-channel extrusion die of the slot type that is eminently suitable for the production of thin laminated or multilayer thermoplastic sheet materials such as those composed of a plurality of layers of the same or different polyethylene, polypropylene, nylon, polycarbonate, polyvinyl chloride, polyvinylidine chloride, polystyrene, and similar resins. More particularly, this invention relates to such an extruson die in which the thicknesses of each of the individual layers or plies of the extruded sheet material can be readily varied and controlled within the die block.

Conventional dies of the slot type that are adapted for the production of such thin multilayer thermoplastic sheet materials generally comprise a body or block that includes a plurality of chambers in each of which the entering stream of molten thermoplastic resin is laterally distributed, a plurality of inlet conduits to the chambers, and a single slot or pair of lips through which the combined layers of the molten thermoplastic resin or resins are extruded as a multilayer sheet. The inner walls of the individual chambers generally taper toward the lips of the die and one of the lips of the die normally is movable so as to permit variation or control of the overall thickness of gauge of the extruded multilayer sheet or film.

The principal object of this invention is to provide a simple die which has a plurality of channels, each of which leads into a slot or pair of lips from which a composite sheet comprising two or more layers of the same or different resins can be extruded, in which die the thickness of each of the individual layers of the extruded multilayer sheet can be readily varied and controlled and in which the overall thickness of the multilayer sheet is controlled by conventional adjustment of the lips or slot of the die through which the multilayer sheet is extruded. The dies of the present invention are much simpler than known dies that include means for varying or controlling the thicknesses of individual layers of such multilayer sheet materials.

Figure 1:
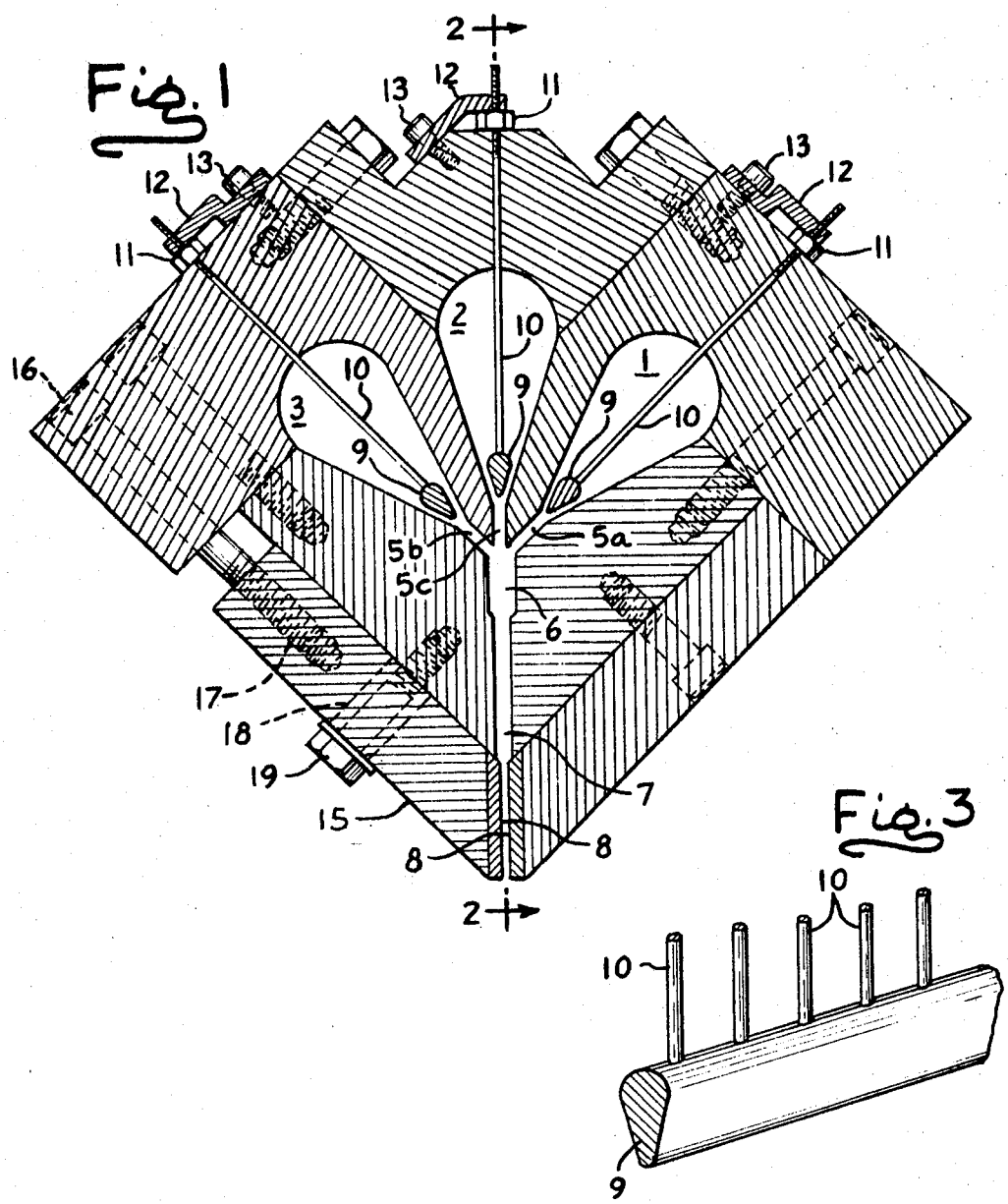
Figure 2:
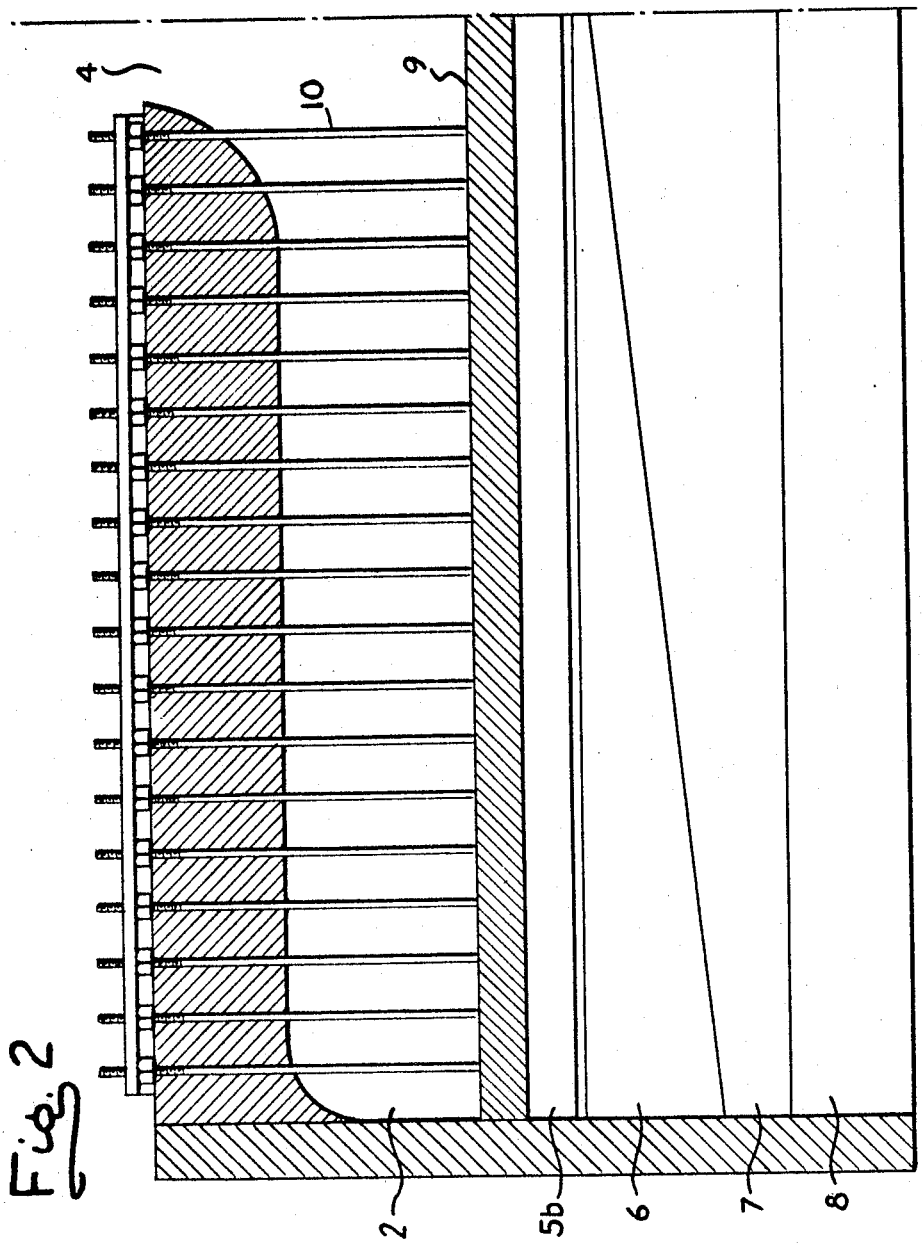

A preferred form of the multiple-channel die of the present invention that is eminently suitable for the production of such multilayer thermoplastic sheet materials, in which thicknesses of the individual layers of the sheet material can be readily varied and controlled, is represented in the accompanying drawings, of which FIGURE 1 is a cross-sectional side view of the die,
FIGURE 2 is a fragmentary front cross-sectional view through the center of the die along the line 2—2 of FIGURE 1, and FIGURE 3 is a fragmentary perspective view of a portion of the wedge or plug that is included in each of the chambers of the die for controlling the thickness of the sheet or film extruded from the die.

Each of the chambers 1, 2, and 3 of the die that is represented in the drawings has an inlet port and channel for molten thermoplastic resin. The inlet port and channel 4 for chamber 2 is shown in FIGURE 2 of the drawings. The chambers 1, 2, and 3, which are represented in FIGURE 1, are also provided with outlet ports and channels 5a, 5b, and 5c, respectively, each of which is a long narrow groove or slot rather than a tube, which discharges into a common channel or slot 6 that continues as a narrower channel or slot 7 before reaching the lips 8 of the die, from which the multilayer sheet will be extruded when the die is used for its intended purpose.

Each of the chambers 1, 2, and 3 of the die is provided with a movable wedge or plug 9 which is supported or held in position in the chamber by a series of rods or spindles 10. These wedges can be moved toward or away from the openings in the walls of the chamber that lead into the outlet ports and channels 5a, 5b, and 5c, and thereby control the rate of flow of the molten thermoplasic resin into and through the ports, in which respect the wedge resembles the plug or disk of a conventional valve, while the opening in the chamber wall serves as a seat for the wedge. The wedge is of such shape that the flow of resin from a chamber is stopped completely when the wedge is seated in the opening in the wall of the chamber.

The edges of the wedges 9 can be rounded as represented in the drawings to present a streamlined appearance so as to repress the development of turbulence in the stream of molten resin as it passes over the surfaces of the wedge. Each wedge normally is provided with a plurality of spindles, the exact number of which is dependent upon its width, but these spindles are generally spaced at intervals of approximately one inch from each other, although spacing at longer or shorter intervals may be desirable in some cases.

The ends of each of the spindles 10 that extend outside the die block are threaded and are each provided with a threaded adjusting or setting nut 11 by means of which the position of the wedge 9 with respect to the seat or opening in the chamber wall can be adjusted. After the nuts 11 have been properly set on the threaded ends of the spindles, the spindles can be fastened to the block by a brace 12 which fits over the nut and is held to the block by a bolt 13 that is fitted into a threaded recess in the block. The brace 12 can be and preferably is wide enough to accommodate and hold more than one spindle. However, more than one bolt 13 may be required to hold a wide brace to the block.

The body or block of the die can be assembled from individual segments of suitable metals, as represented in FIGURE 1, and these segments can be held together with bolts fitting into threaded recesses in the block, or by welding or other means. However, the die can be composed of fewer individual segments than are represented in the drawings.

To change the distance between the lips, and consequently the thickness of the extruded sheet, any of the means that are used in conventional dies may be adopted. This adjustment can be conveniently made, however, by having one of the two lips of the die mounted upon a separate segment 15, as represented in FIGURE 1. In this arrangement, the movement of the segment to change the position of the movable lip with respect to the stationary lip is controlled by a threaded bolt 16 which is fitted into a threaded recess 17 of that segment.

The setting of the movable lip can be more firmly maintained when the segment 15 is provided with a slot or hole 18 and a setscrew 19 that fits into a threaded recess of the block, as represented in FIGURE 1. The slot or hole 18 should be large enough so that the segment 15 can be moved sufficiently to make any adjustment of the movable lip that may subsequently be required without displacing the setscrew when it is fitted into its threaded recess in the block.

Although the foregoing description is directed to a three-channel die, which is a preferred species of the invention and was selected merely for purposes of illustration, it is to be understood that dies having two and more than three chambers can be constructed in the same manner in accordance with this disclosure, and are included within the preview of this invention.

I claim:
1. A multiple-channel extrusion die adapted for the production of multilayer thermoplastic sheet meaterials which consists essentially of a block which includes
    (a) a plurality of chambers in each of which a molten thermoplastic resin can be distributed laterally,
    (b) a pair of lips through which molten thermoplastic resins can be extruded as a sheet,
    (c) individual inlet ports and channels to each of the chambers through which molten thermoplastic resins can be charged to the chambers,
    (d) individual slotlike outlet openings in the confining walls of each of the chambers, each of which lead into an outlet port and channel,
    (e) a common slotlike channel connecting each of the outlet channels from the chambers to the lips of the die, and
    (f) individual wedges in each of the chambers, each of which is capable of closing the slotlike outlet opening in the confining wall of the chamber and be moved toward and away from the opening to open and close the same and thereby control the flow of the layer of molten resin from the chamber.
2. A multiple-channel extrusion die as defined in claim 1 in which each of the wedges is provided with a plurality of spindles whose ends extend outside the die block, which spindles are each provided with an adjusting nut and brace by means of which the wedge can be held in a stationary position with respect to the opening in the confining wall of the chamber.
3. A multiple-channel extrusion die as defined in claim 1 in which one of the lips of the die is mounted upon a separate segment of the die block so that the spacing between the die lips can be changed.

References Cited

UNITED STATES PATENTS

| | | |
|---|---|---|
| Re. 26,237 | 7/1967 | Rowland. |
| 1,603,813 | 10/1926 | Stein. |
| 3,302,239 | 2/1967 | Senecal. |
| 3,398,431 | 8/1968 | Corbett. |

WILLIAM J. STEPHENSON, Primary Examiner

U.S. Cl. X.R.

18—13